United States Patent [19]

Inoue et al.

[11] 4,426,883

[45] Jan. 24, 1984

[54] WEB ROLL AMOUNT DETECTING APPARATUS

[75] Inventors: Shunzo Inoue; Takeshi Nagasawa, both of Yokohama; Toshio Iwaya, Shiki; Michio Kasuya, Fuchu; Shinji Murata, Tokyo, all of Japan

[73] Assignee: Canon Kabushiki Kaisha, Tokyo, Japan

[21] Appl. No.: 339,518

[22] Filed: Jan. 15, 1982

[30] Foreign Application Priority Data

Jan. 30, 1981 [JP] Japan ................................ 56-12476

[51] Int. Cl.$^3$ .............................................. G01B 7/04
[52] U.S. Cl. ........................................ 73/159; 33/142
[58] Field of Search ....................... 73/159; 242/75.52; 364/562; 33/133, 140, 142

[56] References Cited

U.S. PATENT DOCUMENTS 4,052,599 10/1977 Whiteley et al. ............... 364/562 X
4,151,403 4/1979 Woolston ....................... 364/562 X
4,159,572 7/1979 Nunes .................................. 33/142

Primary Examiner—Jerry W. Myracle
Attorney, Agent, or Firm—Fitzpatrick, Cella, Harper & Scinto

[57] ABSTRACT

An apparatus for detecting the length of web wound on a bobbin. The apparatus detects the amount of rotation of the bobbin and the amount of feed of the web and detects the amount of roll by an operation on the basis of the detected amounts. The amount of rotation of the bobbin is detected by the pulses generated in response to the rotation of the bobbin and counted by a first counter. The amount of feed of the web is detected by the pulses generated in response to the feeding of the web and counted by a second counter. The amount of roll is calculated by an operation device on the basis of the count values of the first and second counters.

10 Claims, 6 Drawing Figures

WEB ROLL AMOUNT DETECTING APPARATUS

BACKGROUND OF THE INVENTION

1. Field of the Invention

This invention relates to a roll amount detecting apparatus for detecting the amount of roll of a long footage of web such as film, tape or the like wound on a bobbin such as a reel or the like, namely, the length of the web.

2. Description of the Prior Art

Where the length of a film wound on a bobbin such as a reel or the like is to be detected, a rotatable member has been provided which contacts the bobbin and which is rotatable about a certain fulcrum when the film is wound and which contacts the surface of the film wound on the bobbin, and the angle of rotation of this rotatable member has been detected to thereby detect the amount of roll of the film in an analogous fashion.

In such a roll amount detecting apparatus, however, the dimensional accuracy, mounting accuracy, etc. of the rotatable member have all affected the detection accuracy and it has been impossible to accurately detect the amount of roll and, where this detected amount is to be changed into a digital value, it has been necessary to carry out A-D conversion. Also, to enhance the detection accuracy when the amount of roll has become small, it has been necessary to design the apparatus such that the angle of rotation of the rotatable member when the amount of roll has become small is enlarged, and this has led to a complicated construction of the apparatus.

SUMMARY OF THE INVENTION

It is therefore an object of the present invention to eliminate the above-noted disadvantages and to provide a web roll amount detecting apparatus which can accurately detect the amount of roll of web wound on a bobbin.

It is another object of the present invention to provide an apparatus which can accurately detect the amount of roll of web irrespective of the diameter of the roll of web wound on a bobbin.

It is still another object of the present invention to provide an apparatus for detecting the amount of roll of web without mechanically contacting the surface of the web wound on a bobbin.

It is yet still another object of the present invention to provide an apparatus which can accurately detect the amount of roll of web successively varying in accordance with the feeding of the web.

The invention will become fully apparent from the following detailed description of some specific embodiments thereof taken in conjunction with the accompanying drawings.

DESCRIPTION OF THE PREFERRED EMBODIMENTS

The present invention is applicable to both a case where web is fed from a web supply spindle or bobbin and a case where web is taken up on a web take-up spindle or bobbin, and the invention will hereinafter be described with respect to a case where the amount of roll of the web wound on the web supply spindle is detected, by reference to the drawings.

Figure 1:
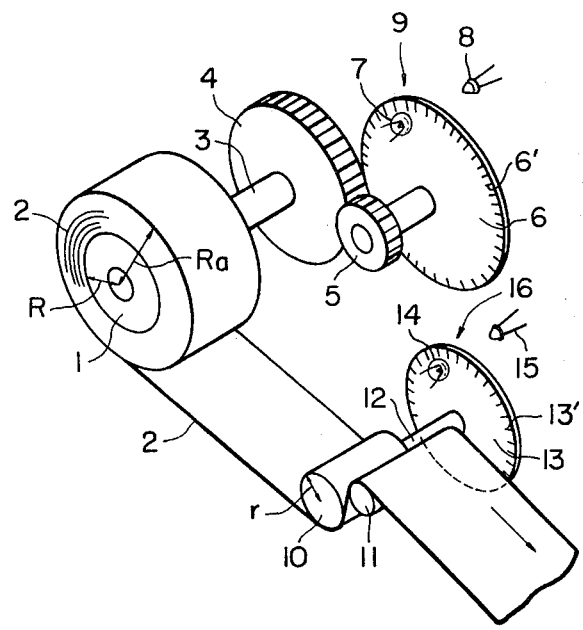
FIG. 1 is a perspective view of a film supply portion to which the present invention is applied.

FIG. 1 shows the film supply portion of a microfilm reader, a microfilm camera or the like and illustrates the manner in which a film wound on the bobbin of the film supply portion is fed. In FIG. 1, reference numeral 1 designates a bobbin, and reference numeral 2 denotes a film wound on the bobbin. A gear 4 is mounted on a shaft 3 rotatable in operative association with the bobbin 1 and meshes with a pinion 5 to rotate the pinion 5 in an accelerated condition. An encoder disc 6 rotatable in operative association with the pinion 5 is mounted on the pinion 5. A number of slit-like holes 6' are formed at predetermined intervals in the peripheral surface of the encoder disc 6, and an illuminating light source 7 and a light-receiving element 8 are disposed in opposed relationship with the holes 6' of the disc 6 interposed therebetween. The disc 6, the light source 7 and the light-receiving element 8 together constitute a pulse generator 9, and when the disc 6 is rotated, the light impinging on the light-receiving element 8 is intermittently intercepted by the disc 6 and pulse is generated from the light-receiving element 8. Accordingly, this pulse generator 9 generates pulses corresponding in number to the amount of rotation of the bobbin when the film 2 is fed from the bobbin 1.

A reference roller 10 which is in contact with the moving film 2 and rotatable in response to movement of the film is provided and urged against the film 2 by a pinch roller 11 so that the roller 10 is reliably rotated in response to movement of the film 2. An encoder disc 13 is mounted on the shaft 12 of the roller 10 for rotation in operative association with the roller 10, and a number of slit-like holes 13' are formed at predetermined intervals in the peripheral surface of the encoder disc 13, and an illuminating light source 14 and a light-receiving element 15 are disposed in opposed relationship with the holes 13' of the disc 13 interposed therebetween. The disc 13, the light source 14 and the light-receiving element 15 together constitute a pulse generator 16, and when the disc 13 is rotated, the light impinging on the light-receiving element 15 is intermittently intercepted and pulse is generated from the light-receiving element 15. Accordingly, this pulse generator 16 generates reference pulses corresponding in number to the amount of feed of the film 2.

Here, let R be the radius of the bobbin 1, $R_a$ be the radius of the roll of the film wound on the bobbin, r be the radius of the roller 10, t be the thickness of the film 2, $n_a$ be the number of revolutions of the bobbin 1 when the film 2 has been fed by a predetermined length, and $n_b$ be the number of revolutions of the reference roller 10. Then, the length l of the film 2 wound on the bobbin 1 can be obtained as follows. The value (area) resulting from subtracting the area of a circle having a radius R from the area of a circle having a radius $R_a$ is equivalent to the length l of the film multiplied by the thickness t of the film.

That is, $$\pi(R_a^2 - R^2) = l \cdot t \quad (1)$$

Also, assuming that the film is rigid, namely, free of extreme expansion and contraction and that the roller 10 and the bobbin 1 are rotated at a speed corresponding to the film feeding speed, the following equation is established:

$$R_a = \frac{n_b}{n_a} \cdot r \quad (2)$$

In the foregoing equation (1), $\pi$ is the ratio of the circumference of a circle to its diameter. Equation (1) becomes $$l = \frac{\pi(R_a^2 - R^2)}{t}$$

and if equation (2) is substituted in this equation, $$l = \frac{\pi}{t} \cdot \left( \frac{n_b^2}{n_a^2} \cdot r^2 - R^2 \right) \quad (3)$$

Now, $\pi$, t, r and R are predetermined values. Accordingly, if the amounts of rotation of the bobbin 1 and the roller 10 are measured by the number of pulses generated from the pulse generators 9 and 16, the length l of the film 2 wound on the bobbin 1 can be calculated. However, the amount of roll calculated thereby may differ more or less from the actual case depending on the condition in which the web is wound and therefore, correction is made by multiplying equation (3) by a correction factor $\alpha$. The correction factor $\alpha$ can be empirically set.

Thus, equation (3) becomes $$l = \frac{\pi \cdot \alpha}{t} \left( \frac{n_b^2}{n_a^2} \cdot r^2 - R^2 \right)$$

Now, as shown in FIG. 1, the gears 4 and 5 are caused to mesh with each other and the encoder disc 6 is rotated in response to rotation of the bobbin, and let $k_1$ ($k_1 = B/A$ when the number of revolutions of the bobbin 1 is A and the number of revolutions of the disc 6 is (B) be the speed up ratio of the encoder disc 6, $k_2$ ($k_2 = C/D$ when the number of slits in the disc 6 is C and the number of slits in the disc 13 is (D) be the ratio of the numbers of slits formed on the circumferences of the discs 6 and 13, k be $k = (1/k_1) \times (1/k_2)$, $N_a$ be the number of pulses generated from the pulse generator 9 during the time the film is fed by a predetermined length, and $N_b$ be the number of pulses generated from the pulse generator 16. Then the length l of the film wound on the bobbin 1 is expressed as follows:

$$l = \frac{\pi \cdot \alpha \cdot K^2 \cdot r^2}{t} \left( \frac{N_b^2}{N_a^2} - \frac{R^2}{r^2 \cdot K^2} \right) \quad (4)$$

The present invention utilizes this principle to detect the length of the web wound on the bobbin.

Figure 2:
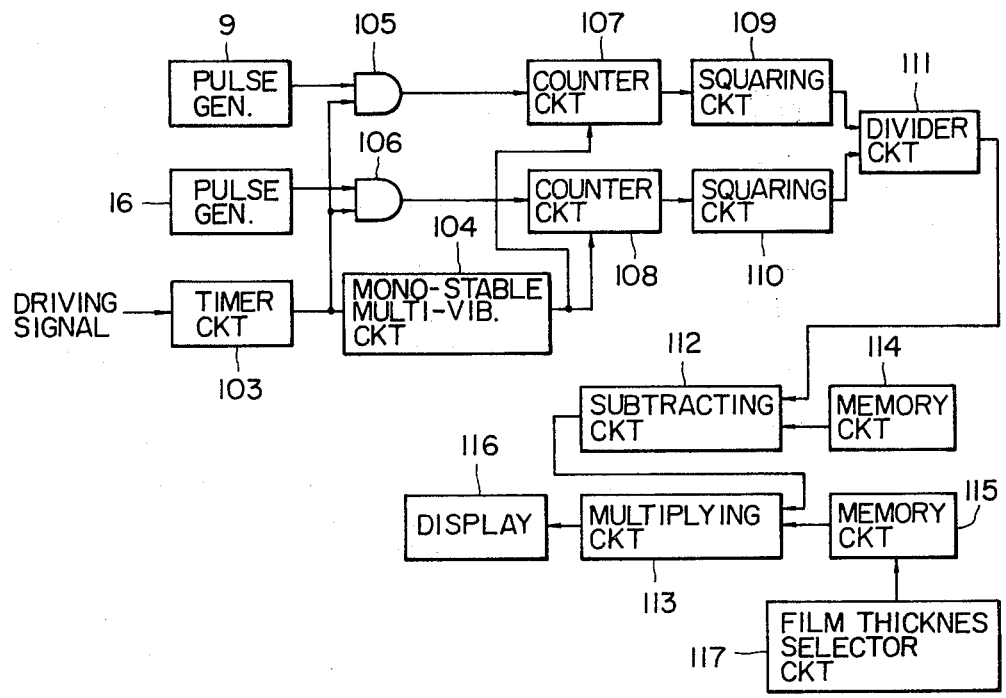
FIG. 2 is a block diagram of a roll amount detecting circuit.

FIG. 2 is a block diagram of a roll amount detecting apparatus embodying the present invention.

In FIG. 2, reference numeral 9 designates the pulse generator shown in FIG. 1 which generates pulses when the disc 6 is rotated. Reference numeral 16 denotes the pulse generator shown in FIG. 1 which generates a reference pulse when the disc 13 is rotated. Reference numeral 103 designates a timer circuit, reference numeral 104 denotes a mono-stable multi-vibrator circuit, reference numerals 105 and 106 designate AND gates, reference numerals 107 and 108 denote counter circuits for counting pulses, reference numerals 109 and 110 designate squaring circuits, reference numeral 111 denotes a divider circuit, reference numeral 112 designates a subtracting circuit, reference numeral 113 denotes a multiplying circuit, reference numerals 114 and 115 designate memory circuit, reference numeral 116 denotes a display device, and reference numeral 117 designates a film thickness selector circuit. A computer may be used as each operation means. When a driving signal is input to it, the timer circuit 103 is operated for a set time and, during its operation, it puts out high level (hereinafter referred to as H) signal. This timer circuit 103 controls the counting periods of the counter circuits 107 and 108 and samples the period for detecting the amount of roll, and during the operation of the timer circuit 103, the counter circuits 107 and 108 count the pulses generated from the pulse generators 9 and 16, and cease to count when the timer circuit 103 ceases its operation. The amount of roll of the film is measured during the operation of the timer circuit. The mono-stable multi-vibrator circuit 104, when the timer circuit 103 puts out H signal, is operated by the rising of the signal and continues to operate for a time equal to or slightly longer than the set time of the timer circuit 103 and puts out H signal during its operation, and becomes inoperative after lapse of a set time and ceases to put out H signal. The counter circuits 107 and 108 are reset to their initial conditions by the rising of the H signal put out by the mono-stable multi-vibrator circuit 104 and, upon falling of the H signal, the count values of the counter circuits 107 and 108 are transferred to the corresponding squaring circuits 109 and 110. The squaring circuits 109, 110, the divider circuit 111, the subtracting circuit 112 and the multiplying circuit 113 successively effect their operations in the named order after the count values of the counter circuits 107 and 108 have been transferred to the squaring circuits 109 and 110. The memory circuit 114 stores the aforementioned predetermined number $$\frac{R^2}{r^2 \cdot K^2}$$

and the memory circuit 115 stores the thickness of the film wound on the bobbin. Well-known ROM (fixed memory device) or the like may be used as the memory circuits 114 and 115.

In the above-described apparatus, when a film feeder (not shown) is operated to feed the film 2 in the direction of arrow and the timer circuit 103 is operated by a driving signal during this feeding, the pulses generated from the pule generators 9 and 16 during the operation of the timer circuit 103 are supplied through the AND gates 105 and 106 to the counter circuits 107 and 108, respectively, and are counted by these counter circuits. After the timer circuit 103 has operated for a set time, the counter values $N_a$ and $N_b$ of the counter circuits 107 and 108 are supplied to the squaring circuits 109 and 110, where $N_a^2$ and $N_b^2$ are operated. Subsequently, the squared values are supplied to the divider circuit 111, where $N_b^2/N_a^2$ is operated. This division value is supplied to the subtracting circuit 112, where $$\frac{N_b^2}{N_a^2} - \frac{R^2}{r^2 \cdot K^2}$$

is operated. This subtraction value is then supplied to the multiplying circuit 113, where $$\left( \frac{N_b^2}{N_a^2} - \frac{R^2}{r^2 \cdot K^2} \right) \cdot \pi \cdot r^2 \cdot K^2 \cdot a/t$$

is operated, this operated value representing the length of the film wound on the bobbin 1 and this value being displayed on the display device 116. When the film is further fed after the amount of roll of the film has been displayed on the display device 116, a driving signal is again supplied to the timer circuit 103 at an arbitrary period of time and the amount of roll is operated in the same manner as previously described, whereby the amount of roll displayed at first is varied and a new amount of roll is displayed on the display device 116. As a result, the amount of roll varied in succession is displayed on the display device.

Figure 3:
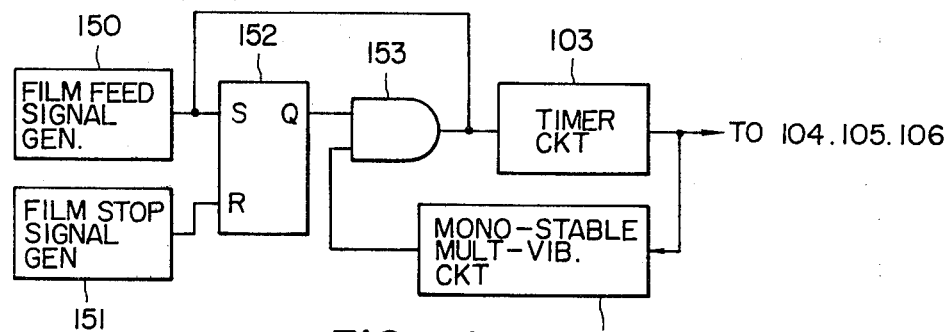
FIG. 3 is a block diagram of a circuit for driving a timer circuit.

Referring to FIG. 3 which shows a circuit for driving the timer circuit 103, reference numeral 150 designates a film feed signal generating circuit, reference numeral 151 denotes a film stop signal generating circuit, reference numeral 152 designates a flip-flop circuit, reference numeral 153 denotes an AND date, and reference numeral 154 designates a mono-stable multi-vibrator circuit operated by the falling of H signal put out by the timer circuit 103 to put out H signal for a predetermined time. The film feed signal generating circuit 150 puts out an H driving signal when the film 2 is fed. The film stop signal generating circuit 151 puts out an H signal when the feeding of the film is stopped.

In the above-described apparatus, when the film is fed, the timer circuit 103 is operated by the rising of the H signal put out by the signal generating circuit 150. On the other hand, the flip-flop circuit 152 is set by the H signal of the signal generating circuit 150 and H signal is put out from the Q terminal of the flip-flop circuit 152. After the timer circuit 103 has been operated for a set time, H signal is put out by the mono-stable multi-vibrator circuit 154 and the AND gate 153 is opened by this signal, so that the timer circuit 103 is again operated by the output signal of the AND gate 153. Accordingly, during the feeding of the film, the timer circuit 103 is repetitively operated, whereby the amount of roll is sampled and detected at a predetermined interval. When the film is stopped, the flip-flop circuit 152 is reset by the H signal put out by the signal generating circuit 151, whereby the timer circuit 103 ceases to be repetitively operated. The set time of the timer circuit 103 is set to a suitable time by the feeding speed of the film and the number of pulses generated from the pulse generators 9 and 16, and this time provides the sampling period for detecting the amount of roll of the film.

Where the film is fed at a predetermined speed, a clock pulse generator for generating pulses at a predetermined interval may be used instead of the pulse generator 16.

In the above-described embodiment, the rotational speed of the disc 6 is increased relative to the rotational speed of the bobbin 1 by the gears 4 and 5, and this is for the purpose of increasing the resolving power of the pulse generator 9 to thereby improve the accuracy with which the amount of roll is detected, and it is not always necessary.

Where the thickness of the film used is changed, the thickness of the new film is input to the film thickness selector circuit 117 and this is stored by the memory circuit 115 to change the stored value of the memory circuit 115.

Where the timer circuit 103 is set to a certain time, there is no problem if the film is fed at a standard speed corresponding to this set time, but if the film is fed at a speed higher or lower than this standard speed, the amount of roll immediately after displayed is greatly varied by the high speed feeding in the case of the higher speed and therefore there occurs an error between the amount of roll of the film displayed by the display device and the amount of film actually wound on the bobbin immediately after the display, and in the case of the lower speed, the number of pulses generated during the set time becomes smaller and this gives rise to a problem that the amount of roll cannot accurately be detected.

Therefore, the present invention is constructed such that the set time of the timer circuit is varied in accordance with the feeding speed of the film.

Figure 4:
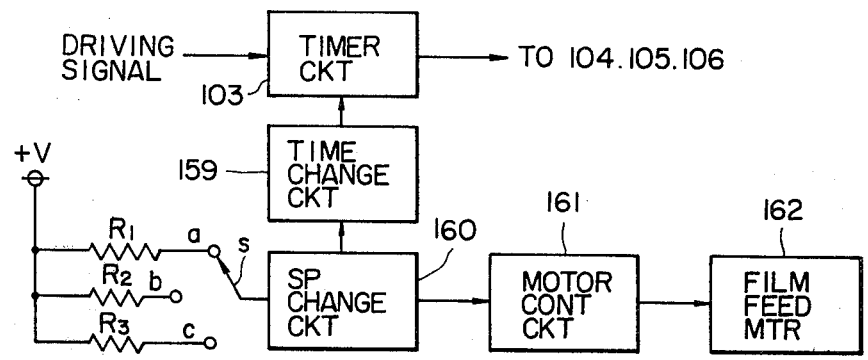
FIG. 4 is a diagram of a circuit for changing the set time of the timer circuit.

FIG. 4 shows such embodiment, in which $R_1$, $R_2$ and $R_3$ designate resistors of different resistance values and S denotes a speed change-over rotary switch selectively changeable over to a, b and c. Reference numeral 159 designates a timer time change circuit, reference numeral 160 denotes a speed change circuit, reference numeral 161 designates a motor control circuit, and reference numeral 162 denotes a film feed motor.

The feeding speed of the film may be changed to three states, i.e., a high speed, a medium speed and a low speed, by the switch S. The speed change circuit 160 puts out a low speed feed signal when the switch S is connected to a, puts out a medium speed feed signal when the switch S is connected to b, and puts out a high speed feed signal when the switch S is connected to c. These signals are supplied to the timer time change circuit 159 and the motor control circuit 161, respectively, and the set time of the timer circuit 103 is changed by these signals and the rotational speed of the motor 162 is changed through the motor control circuit 161. The timer circuit 103 is comprised of, for example, a conventional resistor and capacitor, and the resistance value of the timer circuit is changed by the timer time change circuit 159 in accordance with the signal supplied from the speed change circuit 160 to change the set time, the set time being set to time $t_1$ when the speed is selected by the switch S so that the film is fed at the low speed, the set time being set to time $t_2$ which is shorter than time $t_1$ when the speed is selected so that the film is fed at the medium speed, and the set time being set to time $t_3$ which is shorter than time $t_2$ ($t_1 > t_2 > t_3$) when the speed is selected so that the film is fed at the high speed. Accordingly, by changing the set time in accordance with the feeding speed of the film, the sampling period for the amount of roll is changed and the amount of film actually wound during the display is accurately displayed on the display device 116 even if the feeding speed of the film is varied.

The switch S may be changed over manually or automatically.

In the above-described embodiment, the feeding speed of the film is changed to three stages, but when the feeding speed of the film is to be continuously changed, the set time of the timer circuit may be continuously changed correspondingly to the feeding speed of the film.

Figure 5:
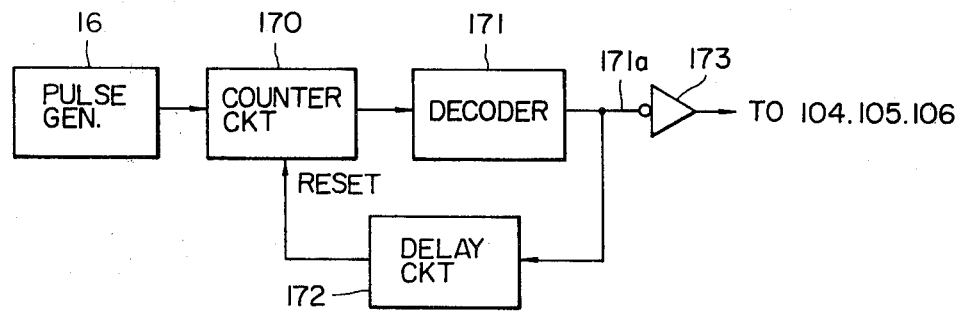
FIG. 5 is a block diagram showing another embodiment for controlling the counting operation of a counter circuit.

In the above-described embodiment, the counting operation of the counter circuit is controlled by the timer circuit, but alternatively, the amount of feed of the film may be detected to thereby control the counting operation. FIG. 5 shows such embodiment, in which reference numeral 170 designates a counter circuit for counting the pulses generated from the pulse generator 16, reference numeral 171 denotes a decoder which puts out a low level signal from an output terminal 171a until the count value reaches a predetermined value and which puts out an H signal from the terminal 171a when the count value exceeds the predetermined value, and reference numeral 172 designates a delay circuit which is operated by the rising of the H signal put out from the terminal 171a and which puts out a reset pulse when a set time has elapsed after the operation of the delay circuit. Designated by 173 is an inverter circuit. The counter circuit 170 is reset to its initial condition by the reset pulse of the delay circuit 172. A predetermined length of film having been fed is detected by the counter circuit 170 and the decoder 171 to thereby control the start of the counting operation of the counter circuits 107 and 108.

The aforementioned equation (4) can be written as follows:

$$l = A(t) \cdot \left( \frac{N_b^2}{N_a^2} - B \right)$$

where A is a function of the film thickness t and B is a constant.

This equation can be transformed as follows:

$$l = A(t) \cdot \left( \frac{N_b^2 - B \cdot N_a^2}{N_a^2} \right) \quad (5)$$

Figure 6:
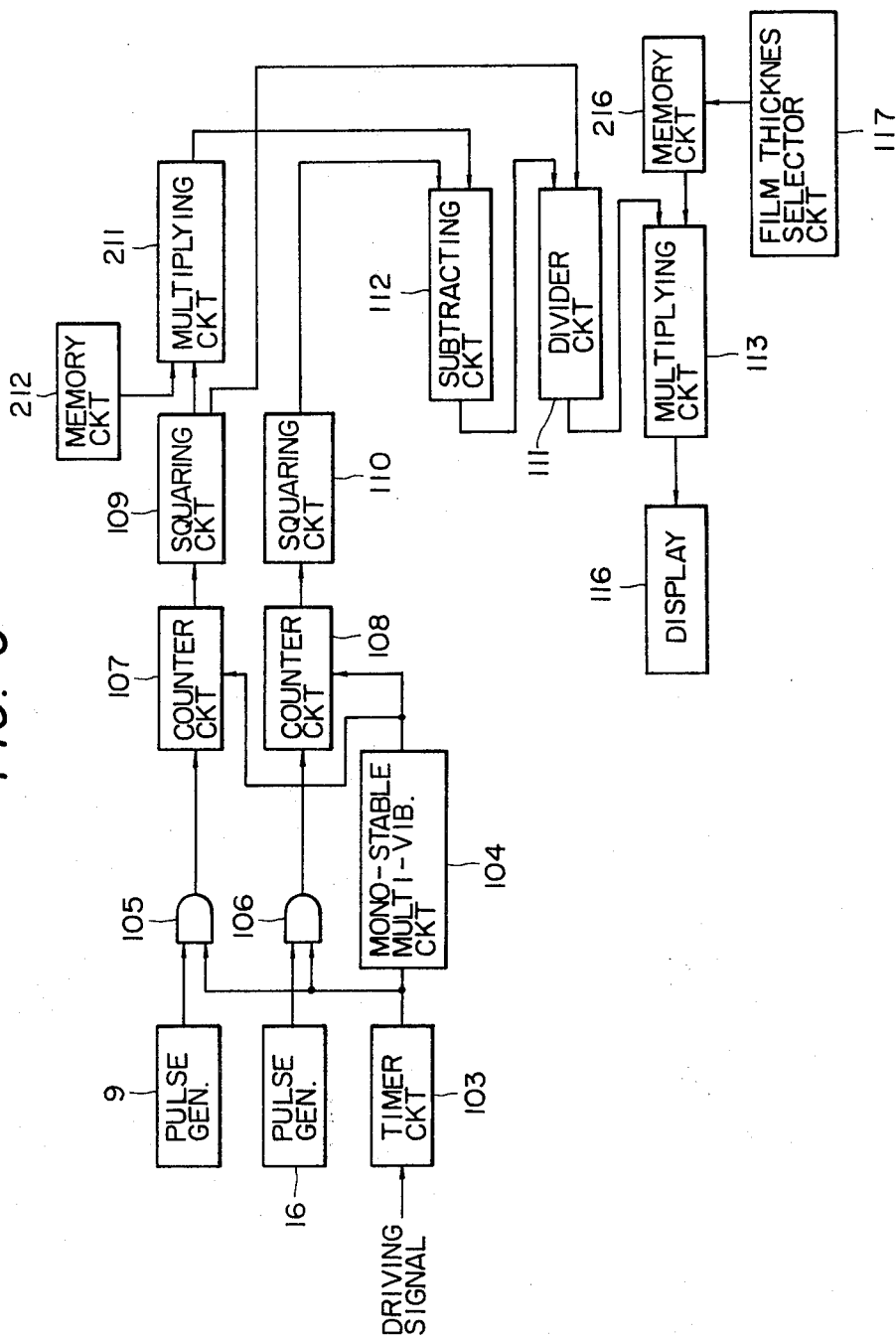
FIG. 6 is a block diagram showing another embodiment of the roll amount detecting circuit.

FIG. 6 shows a circuit for operating the amount of roll on the basis of this equation (5). In FIG. 6, parts similar in construction and function to those of the FIG. 2 embodiment are given similar reference numerals. Reference numeral 212 designates a memory circuit for storing a constant B, and reference numeral 216 denotes a circuit for storing a function A.

The pulses generated from the pulse generators 9 and 16 are sampled by the timer circuit 103 and counted by the counter circuits 107 and 108. These count values are squared by the squaring circuits 109 and 110. The operated value from the squaring circuit 109 is multiplied by the stored value B of the memory circuit 212 in the multiplying circuit 211, and this operated value is input to the subtracting circuit 112 with the operated value of the squaring circuit 110. The subtracting circuit 112 effects the calculation of $N_b^2 - B \cdot N_a^2$, and this operated value is input to the divider circuit 111 with the operated value of the squaring circuit 109. The divider circuit 111 effects the division of $(N_b^2 - B \cdot N_a^2)/N_a^2$, and this operated value is input to the multiplying circuit 113 and multiplied by the stored value A(t) stored in the memory circuit 216, and this operated value is displayed on the display device 216. This displayed value indicates the length of the film wound on the bobbin 1 by the foregoing equation (5).

A memory may be provided in the display device 116, and a numerical value supplied from the multiplying circuit 113 to the display device may be temporally stored in this memory, whereafter this stored value may be displayed on the display surface of the display device 116, whereby the amount of roll may be always displayed on the display device even if the film is stopped. The content of the memory is changed each time a new numerical value is supplied from the multiplying circuit 113.

As described above, the present invention can operate the amount of roll of web by utilizing the amount of rotation of the bobbin on which the web is wound and the amount of feed of the web, can very accurately detect the amount of roll of the web without being affected by the mechanical accuracy as in the prior art, and moreover can always detect the amount of roll properly even if the feeding speed of the web is varied.

What we claim is:

1. A web roll amount detecting apparatus for detecting the length of web wound on a bobbin, said apparatus comprising:
   first detector means for detecting the amount of rotation of the bobbin;
   second detector means for detecting the amount of feed of the web;
   means for setting a factor including the radius of the bobbin and the thickness of the web; and
   operation means for calculating the length of the web wound on the bobbin based upon the amount of rotation detected by said first detector means, the amount of feed detected by said second detector means within a predetermined time period and the factor set by said setting means.

2. The apparatus according to claim 1, wherein said first detector means includes first pulse generating means for generating pulses each time the bobbin rotates through a predetermined angle and first counting means for counting pulses output from said first pulse generating means, wherein said second detector means includes second pulse generating means for generating pulses each time said web moves a predetermined length and second counting means for counting pulses output from said second pulse generating means, and wherein said first and second counting means count pulses output within said predetermined time period, respectively.

3. The apparatus according to claim 2, wherein said operation means calculates $$A \left[ \frac{N_b^2 - B \cdot N_a^2}{N_a^2} \right],$$

where $N_a$ is the count value of said first counter means, $N_b$ is the count value of said second counter means, and A and B represent the factors set by said setting means.

4. The apparatus according to claim 3, wherein set factor A includes the thickness of the web.

5. The apparatus according to claim 1, wherein said predetermined time period is the time required for feeding a predetermined length of the web.

6. The apparatus according to claim 1, further comprising means for varying said predetermined time period in accordance with the feeding speed of the web.

7. A web roll amount detecting apparatus for detecting the length of web wound on a bobbin, said apparatus comprising:
first pulse generating means for generating pulses each time the bobbin makes a predetermined angle of rotation;
first counting means for counting pulses output from said first pulse generating means;
a rotating member which contacts the web and rotates following the feeding of the web;
second pulse generating means for generating pulses each time the rotating member rotates through a predetermined angle;
second counting means for counting pulses output from said second pulse generating means;
means for setting a factor including the radius of the bobbin, thickness of the web and the radius of said rotating member; and
operating means for calculating the length of the web wound on said bobbin based upon the counted values of said first and second counting means within a predetermined time period and the factor set by said setting means.

8. The apparatus according to claim 7, wherein said operation means calculates $$A\left[\frac{N_b^2 - B \cdot N_a^2}{N_a^2}\right],$$

where $N_a$ is the count value of said first counter means, $N_b$ is the count value of said second counter means, and A and B represent factors set by said setting means.

9. The apparatus according to claim 8, wherein said set factor A includes the thickness of the web.

10. The apparatus according to claim 7, further comprises means for varying said predetermined time period in accordance with the feeding speed of the web.

* * * * *